N. H. ANDERSON.

SOUND AND SHOCK ABSORBING FOOT.

APPLICATION FILED JUNE 24, 1918.

Reissued Oct. 26, 1920. 14,964.

Inventor
Nils H. Anderson
by Harry R. Williams,
Atty

UNITED STATES PATENT OFFICE.

NILS H. ANDERSON, OF BRIDGEPORT, CONNECTICUT, ASSIGNOR BY DIRECT AND MESNE ASSIGNMENTS, TO UNDERWOOD TYPEWRITER COMPANY, OF NEW YORK, N. Y., A CORPORATION OF DELAWARE.

SOUND AND SHOCK ABSORBING FOOT.

14,964. Specification of Reissued Letters Patent. Reissued Oct. 26, 1920.

Original No. 1,214,256, dated January 30, 1917, Serial No. 844,225, filed June 10, 1914. Application for reissue filed June 24, 1918. Serial No. 241,709.

*To all whom it may concern:*

Be it known that I, NILS H. ANDERSON, a citizen of the United States, formerly a resident of Middletown, in the county of Middlesex, State of Connecticut, now a resident of Bridgeport, in the county of Fairfield, State of Connecticut, have invented certain new and useful Improvements in Sound and Shock Absorbing Feet, of which the following is a specification.

This invention relates to new and useful improvements in feet or supports for typewriting machines, and refers particularly to sound and shock absorbing feet for typewriters, calculating machines and the like.

The object of the invention is to provide an improved form of sound and shock absorbing feet which may be attached to any of the well known makes of writing machines and so as to support the machine upon either a stationary or folding desk; to design the device so it will serve to support the machine in different positions; further to eliminate the use of springs, to include a rubber cushion and an inclosing case for the same whereby said cushion cannot flatten out and become rigid, and finally to arrange and design the device in a simple, practical and inexpensive manner.

Figure 6:
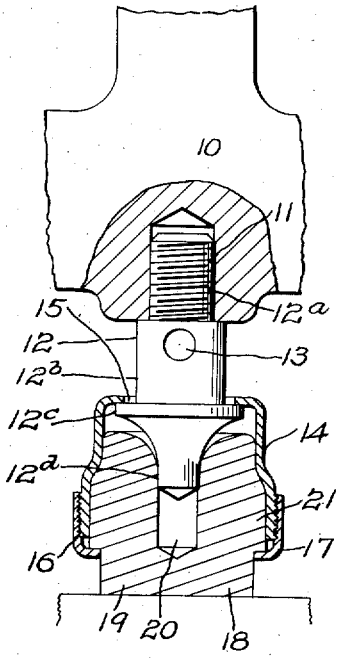
Figure 1:
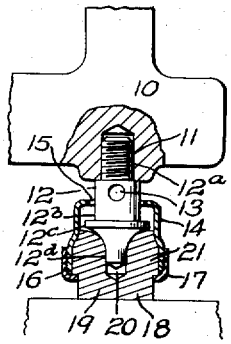
Figure 7:
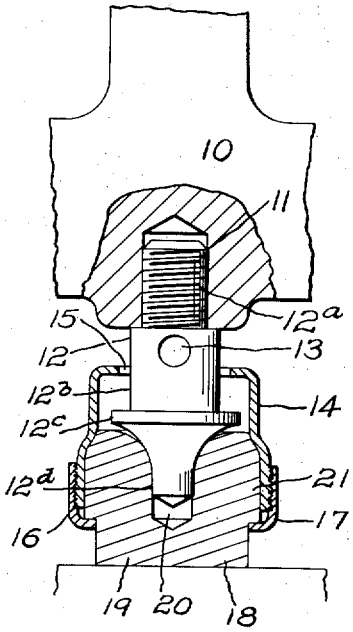
Figure 2:
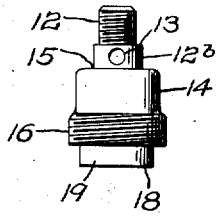
Figure 3:
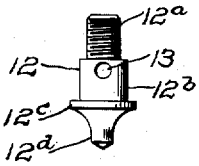
Figure 4:
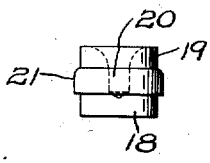
Figure 5:
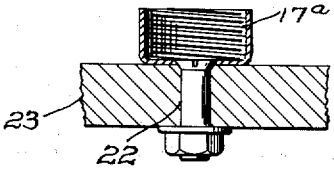

With the above and other objects in view my invention resides and consists in the novel provisions, combination and arrangement of parts, shown upon the accompanying drawings forming a part of this specification, upon which similar characters of reference denote like or corresponding parts throughout the several figures and of which, Figure 1 shows a central vertical sectional elevation of my improved typewriter foot, shown attached to the frame of a writing machine. Fig. 2 shows a detached side view of three of the parts of the foot assembled, but not connected with the writing machine frame. Fig. 3 is a detached side elevation of the part of the support which is attached to the writing machine frame and which in turn carries the other parts of the device. Fig. 4 shows a similar detached side view of the cushion or rubber part of the support shown in Figs. 1 and 2. Fig. 5 shows a central vertical sectional elevation of a metal socket adapted for attachment to a desk cover and in which my improved machine foot may be seated. Fig. 6 shows on larger scale a central vertical section of the foot with the parts in the positions occupied before the cushion is subjected to the weight of the machine. Fig. 7 is a similar view, but Figs. 1 and 7 show the relation of the parts when subjected to substantially full weight of the machine and pressure incident to operating the same.

Referring in detail to the characters of reference marked upon the drawings 10 represents a portion of the frame of a writing machine and 11 is a threaded socket in the under side of the same. The frame may obviously be of any of the well known types of machine frames, while the threaded hole would have to be special to receive the attachable part of the foot. This support, or foot, proper is formed in four parts, and one of these parts, viz: the lower sheet metal inclosing cap, would vary slightly in construction according to the particular conditions under which the device is to be used, as will later be more fully explained. The main part of the leg 12 of the foot is clearly shown in Figs. 1 and 3 and as will be noted includes a reduced threaded upper end portion $12^a$, an intermediate and similar larger body portion $12^b$, an annular flange portion $12^c$ and a tapered lower end portion $12^d$, the purpose of the tapering, which it will be seen is not a straight taper but curved, being to effect a complete absorption of shock and sound when the machine is being operated. As will be explained, a rubber cushion pad 19 has a central pocket to receive this tapered leg. Moreover the rubber pad is provided with the inclosing case 14, whereby the pad is supported from flattening out under the downward pressure of the tapered leg. Since the leg is tapered, it comes to a fit in the pocket, which it will be noted is also of a corresponding tapered or matrix form. Said leg, because of its taper, not only comes to a fit, but also tends to open the pocket with a wedge-like action, and to spread the pad, but this spreading or flattening movement is prevented by the case or shell 14. Therefore, the pad substantially retains its shape when bearing the weight of the typewriter, thus gaining advantage from the curvature of the taper, inasmuch as owing to this curvature of the taper there is offered added resistance to the downward pressure of the machine, as such pressure increases. This is because, as the machine presses down more and more, there is a greater and greater area of contact between the curved-taper leg and the curved-taper pocket, and hence the pad becomes firmer and firmer. It will be understood from Figs. 1 and 7 that originally the tapered foot does not settle all the way down into the tapered or flaring pocket, but that this settling does occur with additional weight, due to jarring of the machine in operation, and that the greater the weight imposed, the greater the resistance offered by the foot, owing to the increase in the area of contact between the flaring or convexly curved pocket in the rubber cushion and the concave-taper leg. To secure such increasing area, the curvature of the foot and that of the pocket should be mismatched, as illustrated at Fig. 1 and seen more clearly in Fig. 7. The tapering of the upper portion of the leg should be more gradual than the flaring of the pocket, as shown. I also preferably include a hole 13 in the body portion of the leg to receive a suitable tool or instrument for screwing the leg into the threaded hole of the machine frame, as in the attachment of the foot to a machine.

The shell 14 is provided with a suitable hole 15 through which the intermediate portion $12^b$ of the foot passes. Said parts are thus connected before the leg is attached to a machine. The lower portion of this shell is somewhat larger than the upper portion and its peripheral face is threaded, as at 16, to receive the cap 17 which like the upper shell is provided with a hole therethrough to accommodate the outer extended portion 18 of the cushion pad 19 and which as before stated is preferably formed of rubber. This pad is made of a size and shape to loosely fit into the lower portion of the inclosure shell and cap, and includes the central pocket 20 to receive the reduced end of the leg and an annular rib 21 to be engaged by the two shell members, as shown in Fig. 1.

When the support is used upon a stationary table it is preferably constructed in the manner indicated in Fig. 1 so that the lower end of the rubber pad is exposed for engagement with the table. On the other hand, if it is to be used in connection with a folding desk where the cover may be tilted and closed in, I would preferably employ a cap $17^a$ like that shown in Fig. 5, and which like the cap 17 is threadably attached to the upper shell 14. The hole through this shell $17^a$ serves to receive an attaching bolt or screw 22 which as shown in Fig. 5 would pass into and preferably through the top 23 of the desk.

From the foregoing it will be noted that the foot is adapted for attachment to most any form of machine in which a suitable threaded hole may be formed, and that when so attached it may be made to become part of the machine, as shown in Fig. 1. When the foot is to be secured to the table in the manner referred to in Figs. 2 and 5 the leg is first attached to the machine and then to the top of the table by turning the shell 14 and running its thread into the thread of the shell $17^a$ so as to secure the support and machine to the said desk top. When inclosed in either manner a suitable and desirable form of cushion support is formed, so that the fixed and metal inclosing parts of the rubber pad do not come in contact with the metal leg, and the latter is supported wholly and entirely upon the cushion, which insures a soft and yielding support. The inclosing of the rubber serves to prevent it from drying out and further holds it in shape, thus prolonging its life and usefulness.

Having thus described my invention what I claim and desire to secure by Letters Patent is:—

1. A sound eliminating and shock absorbing support for a writing machine, consisting of a rubber cushion, an attachment stud with its lower end resting upon said cushion and its upper end adapted to be secured to the machine to be supported, a shell surrounding said cushion and loosely connected with said stud, and a cap secured to said shell and holding the rubber cushion therein.

2. A sound eliminating and shock absorbing support for a writing machine consisting of a cushioning pad, an attachment stud with one end resting upon said pad and the other end adapted to be secured to the machine to be supported, a shell surrounding said pad and loosely connected with said stud, and a cap secured to said shell and holding the pad therein, said cap having an opening in its lower end through which the lower end of the pad projects.

3. A sound eliminating and shock absorbing support for a writing machine, consisting of a rubber cushion, having a pocket in its upper face, an attachment stud with its lower end loosely fitting the pocket in the cushion, and its upper end adapted to be secured to the machine to be supported, a shell surrounding said cushion and loosely fitted upon the supporting stud, and a cap secured to the shell and holding the rubber cushion therein.

4. A sound eliminating and shock absorbing support for a writing machine consisting of an attachment stud having a threaded upper end and a tapered lower end, a shell movably secured to said stud, a perforated cap secured upon the lower end of the shell, and a cushion pad fitting within and held in the shell by said cap, said pad having a tapering recess in its upper end fitting the lower end of the attachment stud, and its lower end projecting through said cap.

5. A sound eliminating and shock absorbing support for a writing machine consisting of an attachment stud, having a threaded upper end, a reduced lower end, and an annular flange intermediate the ends, a shell loosely fitted upon said stud above the flange, a perforated cap secured upon the lower end of the shell, and a cushion pad held within the shell by said cap, and having its upper end supporting the stud, and its lower end projecting through the cap.

6. A sound-eliminating and shock-absorbing support for a machine, comprising an attachment having a leg formed with a taper having a concave curve, a cushion having a pocket with a corresponding convex curve to receive said leg, and means to support the pad against expansion from the weight of the machine.

7. A sound-eliminating and shock-absorbing support for a machine, comprising an attachment having a leg formed with a taper having a concave curve, a cushion having a pocket with a corresponding convex curve to receive said leg, the concave curve being more gradual than the convex curve, for the purpose specified, and means to support the pad against expansion from the weight of the machine.

8. A sound-eliminating and shock-absorbing support for a machine, comprising an attachment having a leg formed with a taper having a concave curve, a cushion having a pocket with a corresponding convex curve to receive said leg, the concave curve being more gradual than the convex curve, for the purpose specified, and a supporting shell surrounding said cushion and loosely holding it to said attachment.

NILS H. ANDERSON.